United States Patent [19]

Seelig et al.

[11] Patent Number: 5,405,577
[45] Date of Patent: Apr. 11, 1995

[54] LEAD-FREE AND BISMUTH-FREE TIN ALLOY SOLDER COMPOSITION

[76] Inventors: Karl F. Seelig, 32 Deck St., Jamestown, R.I. 02835; Donald G. Lockard, 85 Meadow St., North Providence, R.I. 02904

[21] Appl. No.: 225,826

[22] Filed: Apr. 11, 1994

Related U.S. Application Data

[63] Continuation-in-part of Ser. No. 52,518, Apr. 29, 1993, Pat. No. 5,352,407.

[51] Int. Cl.$^6$ .............................................. C22C 13/00
[52] U.S. Cl. .................................... 420/561; 420/560; 420/562
[58] Field of Search ...................... 420/561, 560, 562

[56] References Cited

U.S. PATENT DOCUMENTS

| | | |
|---|---|---|
| 3,503,721 | 3/1970 | Lupfer .................... 420/557 |
| 4,695,428 | 9/1987 | Ballentine et al. ......... 420/560 |
| 4,758,407 | 7/1988 | Ballentine et al. ......... 420/561 |
| 4,778,733 | 10/1988 | Lubrano et al. ........... 420/560 |

FOREIGN PATENT DOCUMENTS 183037 6/1966 U.S.S.R. ............................. 420/561

*Primary Examiner*—Upendra Roy
*Attorney, Agent, or Firm*—Barlow & Barlow, Ltd.

[57] ABSTRACT

A lead-free and bismuth-free solder alloy composition for electronic assembly applications having reduced toxicity. The alloy composition consists of, in weight percent, 90.3–99.2% tin, 0.5–3.5% silver, 0.1–2.8% copper, and 0.2–2.0% antimony. The alloy composition has a melting temperature of 210°–216° C. with superior wetting and mechanical strength making the alloy composition well suited for electronic circuit board manufacture and replacement of conventional tin-lead solders.

17 Claims, No Drawings

LEAD-FREE AND BISMUTH-FREE TIN ALLOY SOLDER COMPOSITION

This application is a Continuation-In-Part application of patent application Ser. No. 08/052,518, filed Apr. 29, 1993, now U.S. Pat. No. 5,352,407.

BACKGROUND OF THE INVENTION

The present invention relates generally to an improved solder composition. More specifically, the present invention relates to an improved solder composition that contains no lead or bismuth yet still achieves superior soldering characteristics.

In the electronic manufacturing of printed circuit boards and the assembly of components thereon, it has been well known to employ solders containing tin and lead to provide mechanical and electrical connections. Solders which contain tin and lead typically yield highly reliable connections in both automated and manual soldering and provide a surface on printed circuit boards extremely conducive to soldering.

However, the use of such tin-lead solders in the manufacture of printed circuit boards and is assembly of components is becoming more and more problematic due to the toxic effects of lead exposure to workers and the inevitable generation of hazardous waste. Due to these environmental concerns, action is being taken to limit the amount of lead entering into the environment. Recently, federal and many state government agencies have begun to urge the electronics industry to find alternatives to tin-lead solders to reduce worker lead exposure and lessen the amount of lead waste going back into the environment. Long term exposure to lead can greatly effect the health of workers. For example, even small amounts of lead can affect the neurological development of fetuses in pregnant workers.

Tin-lead alloys of, for example, sixty (60%) percent tin, forty (40%) percent lead; and sixty-three (63%) percent tin, thirty-seven (37%) percent lead have historically been used for most electronic soldering operations. These alloys have been selected and are preferred because of their low melting temperatures, mechanical strength, low relative cost, as well as superior wetting characteristics and electrical conductivity.

Due to the materials used, many components and printed circuit boards are easily damaged by exposure to high temperatures during manufacture or assembly. Because of the heat transfer and distribution limitations and concerns, printed circuit boards are typically exposed to temperatures higher than the liquidus temperature of the alloy employed. In response to this concern, electronic manufacturers are exploring alternative alloys to replace the tin-lead alloys.

Compositions containing bismuth were attempted as a substitute for tin-lead alloys. However, these alloys were quickly rejected due to their many problems. For example, alloys containing bismuth exhibit poor soldering and extremely poor peel strength with reduced wetting characteristics for electronic soldering. Further, these bismuth alloys typically fail mechanical thermocycling strength tests that have been performed throughout the electronics industry. Since bismuth is typically mined from lead ores, lead production must be maintained to recover bismuth. Also, known reserves of bismuth are completely inadequate to serve the needs of the growing electronics industry. Therefore, alloys containing bismuth are unacceptable as a substitute for tin-lead alloys.

The prior art has not provided a solder composition exhibiting optimum wetting and flow properties without toxicity. Currently federal, military and commercial solder specifications lack a suitable non-toxic composition. The following prior art patents illustrate inadequate attempts to meet these needs.

Soviet Union Patent No. 183,037, issued to A. I. Gubin, et al. discloses an alloy containing antimony of $1\pm0.3\%$; copper $2\pm0.3\%$; silver $5\pm0.3\%$ and the remainder being tin and having a melting point of 225°–250° C. This alloy has a liquidus temperature that does not allow it to be used in electronic soldering because the soldering temperature required to flow the alloy would destroy the printed circuit board and many of the components. No feasible equipment or means currently exists to allow this alloy to be used for the purpose of electronic soldering or coating. Due to the high silver content, this alloy has an economic disadvantage in the marketplace.

U.S. Pat. No. 3,503,721, issued to Lupfer, discloses a tin-silver alloy of 96.5% tin and $3.5\pm0.5\%$ silver with wetting and electrical conductivity characteristics marginally acceptable to suit the needs of the electronics industry. However, this alloy has mechanical strength weaknesses that would prohibit its use on a wide range of electronic printed circuit board assemblies. For example, creep strength, a measure of flow under pressure, and percent elongation, metal stretching before fracture, are considerably lower than the tin-lead alloys now used. Even with the common tin-lead alloys, solder joints stress fractures are the cause of many field failures in printed circuit boards where vibration or temperature variations occur. In addition, the liquidus temperature of 221° C. requires that automated soldering be accomplished at a temperature that in many situations would damage the printed circuit board and/or the components. Due to the high content of silver, the cost of this alloy is considerably higher than tin-lead alloys. For each percentage point of silver added to the alloy, the price increases by approximately $0.75/lbs. (based on a silver market of $5.00/troy ounce.)

U.S. Pat. No. 4,778,733, issued to Lubrano, et al., discloses an alloy containing, by weight, 0.7% to 6% copper; 0.05% to 3% silver; with the remainder being tin with a temperature range of 440°–630° F. This alloy does not use antimony in its composition. As a result, this alloy has a melting temperature that is too high to be used in a wide range of electronic soldering applications without damaging printed circuit boards or components. In addition, the alloy disclosed by Lubrano, et al. exhibits inferior soldering performance, slow wetting times and mechanical strengths ill-suited to electronic assembly applications.

U.S. Pat. No. 4,695,428, issued to Ballentine, et al., discloses an alloy containing 0.5–4% antimony; 0.5–4% zinc; 0.1–3% silver; 0.1–2% copper; 88–98.8% tin. The zinc content in this alloy causes the alloy to oxidize quickly. This inhibits wetting and flow producing high dross formation which results in extremely high defect levels. The productivity lost in using such as composition for mass electronic soldering makes it an unacceptable alternative to tin-lead solders.

U.S. Pat. No. 4,758,407, issued to Ballentine, et al., discloses an alloy containing tin, copper, nickel, silver and antimony. All of the alloy combinations disclosed by Ballentine, et al. have liquidus temperatures in excess of those required for electronic assembly. The lowest disclosed liquidus temperature is 238° C. which is unacceptable for use in the electronics industry.

Since heretofore no acceptable substitute for tin-lead alloys have been found, there is a need in the electronics industry for an alloy composition without lead or bismuth which can achieve the physical characteristics and application performance of tin-lead solder alloys but without the toxic elements.

SUMMARY OF THE INVENTION

The present invention preserves the advantages of prior art solder compositions. In addition, it provides new advantages not found in currently available solder compositions, and overcomes many of the disadvantages of such currently available compositions.

The invention is generally directed to a novel and unique solder composition with is particular application in the electronic manufacturing of printed circuit boards and the assembly of components therein. The solder composition of the present invention achieves the desired physical characteristics, such as wetting, peel strength, low melting point, physical strength, fatigue resistance, and electrical conductivity, but without the toxic elements found in known tin-lead solder alloys.

The alloy composition of the present invention includes a combination of tin, silver, copper, and antimony to offer a unique set of physical characteristics that allow it to be used as a viable alternative to tin-lead alloys in electronic soldering and printed circuit board coating. The alloy of the present invention possesses physical characteristics that result in a stronger mechanical joint with superior fatigue resistance to tin-lead alloys, tin-silver alloys, or alloys containing bismuth. In addition, the melting point temperature is lower than any other lead-free or bismuth free alternative solder alloy.

The preferred embodiment of the present invention has a reduced toxicity and a melting point between 210° C. and 216° C. and consisting of, in weight percent, 90.3–99.2% tin; 0.5–3.5% silver; 0.1–2.8% copper; and 0.2–2.0% antimony.

It is therefore an object of the present invention to provide a solder composition that is a viable substitute for tin-lead solder alloys.

Another object of the present invention is to provide a solder alloy composition that is well suited for the electronic manufacturing of printed circuit boards and the assembly of components thereon.

It is a further object of the present invention to provide a solder alloy composition acceptable for the electronics industry which contains no lead or bismuth.

It is yet a further object of the present invention to provide a solder alloy composition which is free of toxic elements and safe for the environment.

DETAILED DESCRIPTION OF THE PREFERRED EMBODIMENT

The preferred embodiment of the present invention is a lead-free and bismuth-free solder composition which contains tin, copper, antimony, and silver. The solder alloy composition of the present invention has the physical characteristics and the application performance to economically meet the needs of the electronic industry and the assembly and coating of printed circuit boards. In particular, the alloy exhibits ideal physical characteristics yet does not contain toxic elements as in the prior art which could harm workers and the environment.

The preferred embodiment of the present invention is found to exhibit the desired physical characteristics is comprised by weight as follows:

| Tin | 90.3–99.2% |
|---|---|
| Silver | 0.5–3.5% |
| Copper | 0.1–2.8% |
| Antimony | 0.2–2.0% |

For example, the preferred solder composition may contain 2.0% silver; 0.8% copper; 0.6% antimony; and 96.6% tin. The melting point temperature of the composition is in the range of 210°–216° C. The liquidus temperature of 216° C. coupled with superior wetting allows the alloy of the present invention to be used with existing mass and hand soldering equipment without damaging most printed circuit boards or electronic components. The trade name used for the solder composition of the present invention is CASTIN.

This alloy exhibits excellent wetting and melting temperatures, as well as superior physical strength, electrical conductivity, and thermocycling fatigue, for example. As a result of these excellent physical characteristics, the solder alloy composition of the present invention may be successfully substituted for the known tin-lead alloys currently used for electronics assembly and printed circuit board manufacture. Most capital equipment used in electronic soldering can employ this composition. The low melting temperature is low enough not to cause heating damage to the board or components therein.

The solder alloy composition of the present invention is well suited for many different applications. The alloy may be employed in the coating of circuit boards and printed circuit board manufacture by use of "hot-air leveling" or "roll-tinning". These processes improve solderability on the circuit board. Also, the alloy may be used in the assembly of electronic components on printed circuit boards when using a wavesoldering machine. The alloy is also well suited for formation into various shapes and sizes, such as bars, ingots, wire, chips, ribbon, powder, preform and can be used with a core of flux. Therefore, the alloy of the present invention may be used for assembly of electronic components using solder wire and a heating device to hand solder the components to the board.

In the application of coating printed circuit boards, the composition of the present invention has superior wetting characteristics and improved productivity. Prior art tin-lead alloys of the prior art are easily contaminated by copper from the PC boards that are dipped into a bath during processing. Since the composition of the present invention contains copper, minor increases in the copper content do not readily affect performance of the composition. In addition, this new composition will not absorb copper as quickly as prior an tin-lead solders. As a result, this new alloy can remain functional much longer than prior art tin-lead alloys to reduce overall solder consumption drastically and reduce outlay by manufacturers. Moreover, the solderability of the coated board is extended because the intermetallics are distributed evenly throughout the grain boundary of the composition. The result is a higher quality printed circuit board which cannot be achieved by use of prior art solder compositions.

In surfacemount assembly or wavesoldering of components to printed circuit boards, the composition of the present invention can employ the same hot temperatures, pre-heat temperatures, and process parameters as prior art tin-lead solders now currently in use. The nominal composition is very close to a eutectic alloy which exhibits physical characteristics important to high speed, low defect soldering. Since the solder alloy is less easily contaminated than tin-lead alloys, an increased usable life of the solder bath results. Further, solder joints formed by wavesoldering yield higher joint strengths and excellent electrical conductivity with even distribution of intermetallics throughout the solder joint.

The solder alloy composition of the present invention may also be used in the assembly of electronic components using solder wire in a heating device to hand solder the components to the board. Such a method requires a composition that wets and spreads quickly at 250°–300° C. The composition of the present invention can be easily formed into a cored wire solder and used easily and successfully in hand soldering.

An important feature of the solder alloy composition is its superior mechanical strength. Below is an independent comparison test between the solder alloy of the present invention and a prior art tin-lead solder alloy containing 63% tin and 37% lead. As seen below, the mechanical strength of this alloy is superior to known tin-lead alloys.

|  | 63% TIN 37% LEAD | CASTIN |
| --- | --- | --- |
| TENSILE CATEGORIES |  |  |
| UTS(ksi) | 4.92 | 5.73 |
| YIELD STGTH.(ksi) | 4.38 | 4.86 |
| YOUNGS' MODULUS(msi) | 52.8 | 42.40 |
| COMPRESSION CATEGORIES |  |  |
| ELASTIC MOD.(msi) | 3.99 | 4.26 |
| YS(ksi) | 4.52 | 4.33 |
| STRESS 25% (ksi) 7.17 | 8.54 |  |
| HARDNESS CATEGORY ROCKWELL 15W | 10.08 | 18.28 |

Overall, the solder alloy composition of the present invention enjoys a combination of a sufficiently low melting temperature for electronic applications, superior wetting characteristics, and superior mechanical strength to make it an excellent alternative to tin-lead alloys for the needs of the electronic industry for manufacture of printed circuit boards and the assembly of components onto the boards. The superior solderability and wetting characteristics yield even pad thicknesses and low copper solubility to provide a tremendous advantage in the solder coating of printed circuit boards, such as by hot air leveling.

It will be appreciated by those skilled in the art that various changes and modifications can be made to the disclosed embodiments without departing from the spirit of the present invention. All such modifications and changes are intended to be covered by the appended claims.

What is claimed is:

1. A lead-free bismuth-free solder alloy composition for electronic assembly applications having reduced toxicity and a melting point between 210° C. and 216° C. consisting of in weight percent:

| 90.3–99.2% | tin |
| --- | --- |
| 0.5–3.5% | silver |
| 0.1–2.8% | copper |
| 0.2–2.0% | antimony |

2. The alloy composition of claim 1, wherein a flux core is inserted into the composition to form an electronic assembly flux cored wire solder.

3. The alloy composition of claim 1, wherein the composition constitutes a fluxed core of flux and the alloy particles.

4. The alloy composition of claim 1, wherein said alloy composition is formed into a solder bar; said solder bar being used in electronic assembly solder machines.

5. The alloy composition of claim 1, wherein said alloy composition is formed into a solder ingot, said solder ingot being used in electronic assembly.

6. The alloy composition of claim 1, wherein said alloy composition is formed into a solder wire, said solder wire being used in electronic assembly.

7. The alloy composition of claim 1, wherein said alloy composition is formed into a solder chip, said solder chip being used in electronic assembly.

8. The alloy composition of claim 1, wherein said alloy composition is formed Into a solder ribbon, said solder ribbon being used in electronic assembly.

9. The alloy composition of claim 1, wherein said alloy composition is formed Into a solder powder, said solder powder being used in electronic assembly.

10. The alloy composition of claim 1, wherein said alloy composition is formed into a solder preform, said solder preform being used in electronic assembly.

11. The alloy composition of claim 1, wherein said alloy is employed in hot air levelling of printed circuit boards.

12. The alloy composition of claim 1, wherein said alloy is employed in assembling surface mounted printed circuit boards.

13. The alloy composition of claim 1, wherein said alloy is employed in the solder coating of printed circuit boards.

14. The alloy composition of claim 1, wherein said alloy is employed in roll tinning of circuit boards.

15. The alloy composition of claim 1, wherein said alloy is employed in surface mount assembly of electronic components onto a printed circuit board.

16. The alloy composition of claim 10, wherein said solder preform is fluxed.

17. The alloy composition of claim 10, wherein said solder preform is unfluxed.

* * * * *